July 4, 1939.　　　　　H. E. GIROZ　　　　　2,164,912
TENSION CONTROL DEVICE OR THE LIKE
Filed Feb. 11, 1938　　　3 Sheets-Sheet 3

INVENTOR
HENRI EDMOND GIROZ

BY
E. D. Phinney
ATTORNEY

Patented July 4, 1939

2,164,912

UNITED STATES PATENT OFFICE 2,164,912

TENSION CONTROL DEVICE OR THE LIKE

Henri Edmond Giroz, Boulogne-Billancourt, France, assignor to International Standard Electric Corporation, New York, N. Y.

Application February 11, 1938, Serial No. 190,052
In France February 20, 1937

5 Claims. (Cl. 175—363)

This invention relates to arrangements for maintaining constant the supply of rectified current to a load circuit in spite of variations in the load and in the alternating supply to be rectified.

Devices for the regulation of rectified voltage are known, in which the drop of potential between the no-load operation and the full-load operation of one, or of a group, of dry rectifiers may be reduced to a certain extent (for example, from a value of 15 to 20% to a value of the order of 3%) by the use, in the input circuit, of compounding self inductances provided with windings through which flows the rectified current so as to produce a variable degree of saturation in dependence upon the load and by means of so-called pre-loading self inductances.

In accordance with the present invention, the the pre-loading self inductances are also provided with a saturation winding traversed by the rectified current, the said current being controlled by a regulator in dependence upon the load circuit.

The invention will be better understood from the following description taken in conjunction with the accompanying drawings in which.

Figure 1:
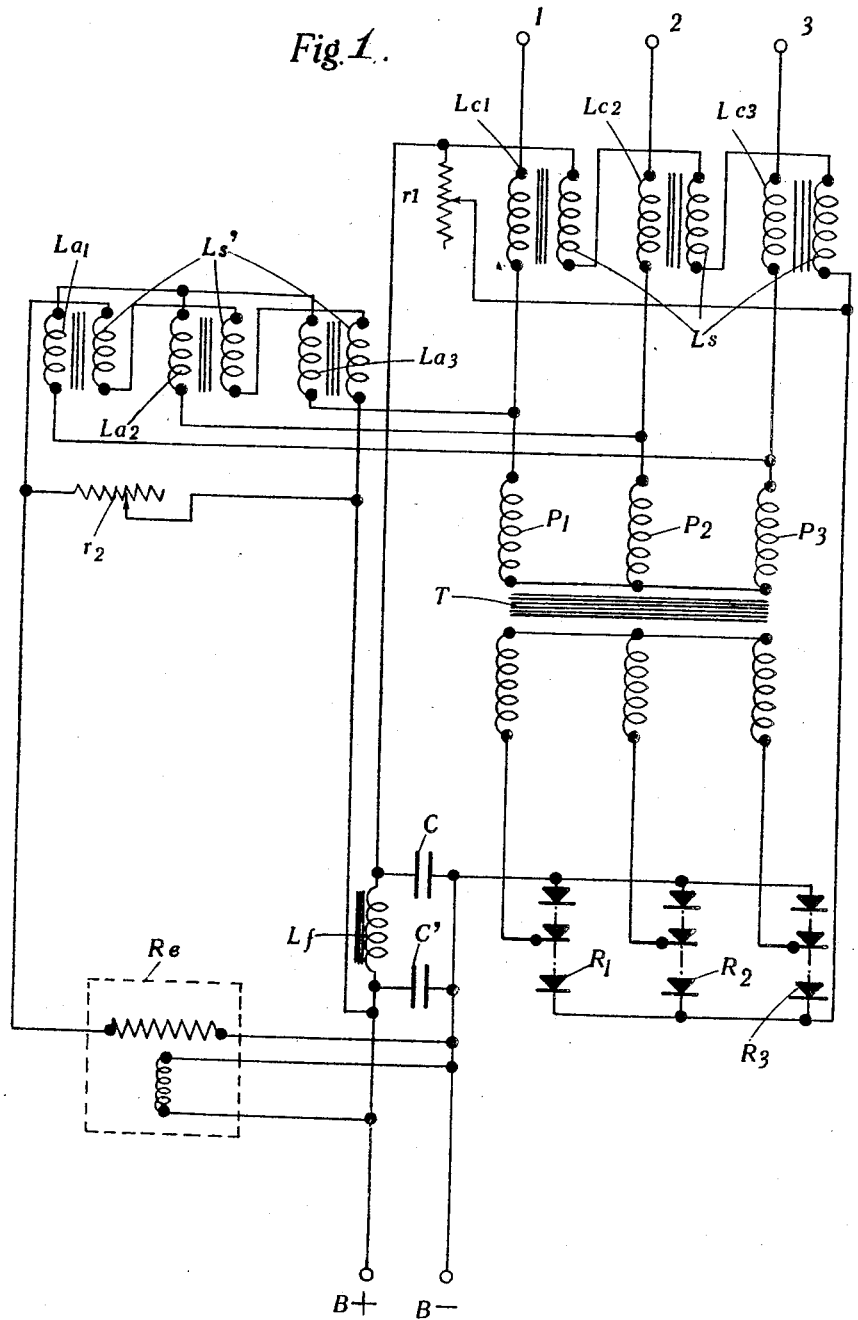
Fig. 1 shows schematically a regulating device according to the invention.

Fig. 1 shows a regulating arrangement in which the primary windings $P_1$, $P_2$ and $P_3$ of a transformer T are connected to the terminals 1, 2 and 3 of the phases of an alternating current supply through compounding self-inductances $L_{c1}$, $L_{c2}$ and $L_{c3}$. The three rectifier units $R_1$, $R_2$, $R_3$ respectively connected to the three secondary windings of the transformer T are mounted in parallel and connected to the load circuit terminals B+ B— through saturation windings $L_s$ inductively coupled to the three compounding self-inductances and through a filter circuit comprising the two condensers C and C' and the self-inductance $L_f$. In shunt, on the connections of the primary windings of the transformer T are self-inductances $L_{a1}$, $L_{a2}$, $L_{a3}$.

So much of the system of Fig. 1 as has been described in the foregoing paragraph is similar to known voltage regulating rectifier systems. This much of the system can be considered as operating in known manner by virtue of the fact that the saturation windings $L_s$ cause the impedance of the alternating windings $L_{c1}$, $L_{c2}$, $L_{c3}$ to vary with the variation in the load, and thus compensate for such variations.

If, however, considerable variations of the network voltage occur the operation of the whole of the device may become unstable because any increase of this voltage produces a proportionate variation of the rectified voltage, and consequently of the output of the rectified side. This increase of output causes an over-voltage of the primary of the transformer T which only increases the effect of over-voltage of the network.

In accordance with my invention, therefore, certain further means in addition to those above described may be added as shown in Fig. 1. Such further means include the provision upon self-inductances $L_{a1}$, $L_{a2}$ and $L_{a3}$ of saturation windings $L_{s'}$ fed through a quick acting regulator device shown schematically at $R_e$ connected in shunt to the output of the rectifiers. This quick-acting regulator device $R_e$ is adapted to introduce into the circuit of the saturation windings $L_{s'}$ a resistance such that the respective variations of this resistance and of the rectified potential are effected in the inverse direction.

The operation of the device is then as follows:

For a normal value of the network voltage and of the rectified voltage the resistance of the quick acting regulator is adjusted to a mean value that the current through the saturation windings $L_{s'}$ has itself a mean value. When the supply voltage increases, the rectified voltage will have a tendency to increase in the same proportion, and from the beginning of this increase the quick acting regulator $R_e$ acts to reduce the value of the resistance in series with the saturation windings $L_{s'}$. The current therein increases, which entails a reduction of the current in the windings $L_{a1}$, $L_{a2}$, $L_{a3}$, and an increase of the drop of voltage $E_s$ in the alternating winding of the compounding self-inductances $L_{c1}$, $L_{c2}$ and $L_{c3}$. When the voltage of the network decreases the resulting effect is the reverse of that described.

Preferably in accordance with my invention the cores of the self-inductances $L_{a1}$, $L_{a2}$, $L_{a3}$, $L_{s'}$ have no air gap, in the system of Fig. 1 and thus only the value of the current in the saturation windings $L_{s'}$ determined the value of the current in the windings $L_{a1}$, $L_{a2}$, $L_{a3}$, while in the somewhat similar known arrangement previously referred to the corresponding self-inductances have an air gap whose adjustment permits the said magnetising current to be fixed at its desired value.

Figure 2:
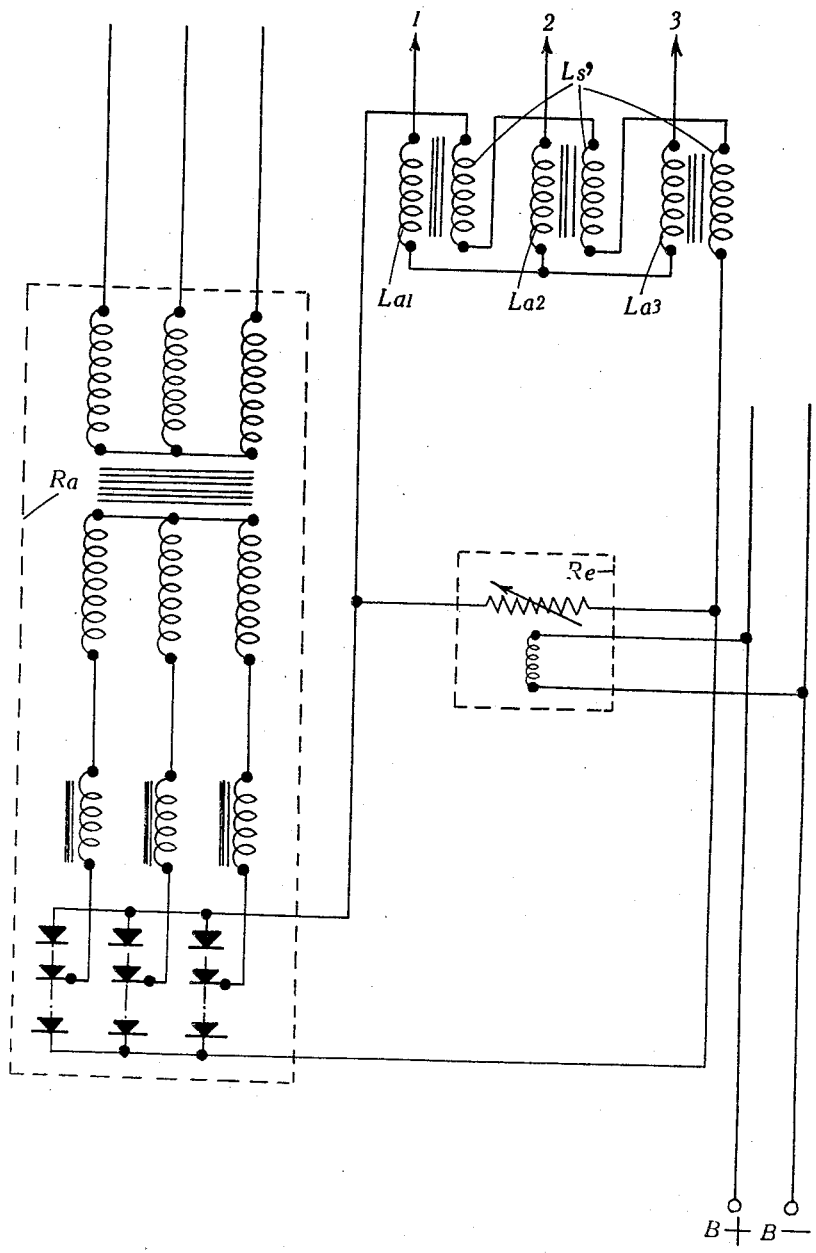
Fig. 2 shows a modified portion of the regulating circuit of Fig. 1; and finally
Figure 3:
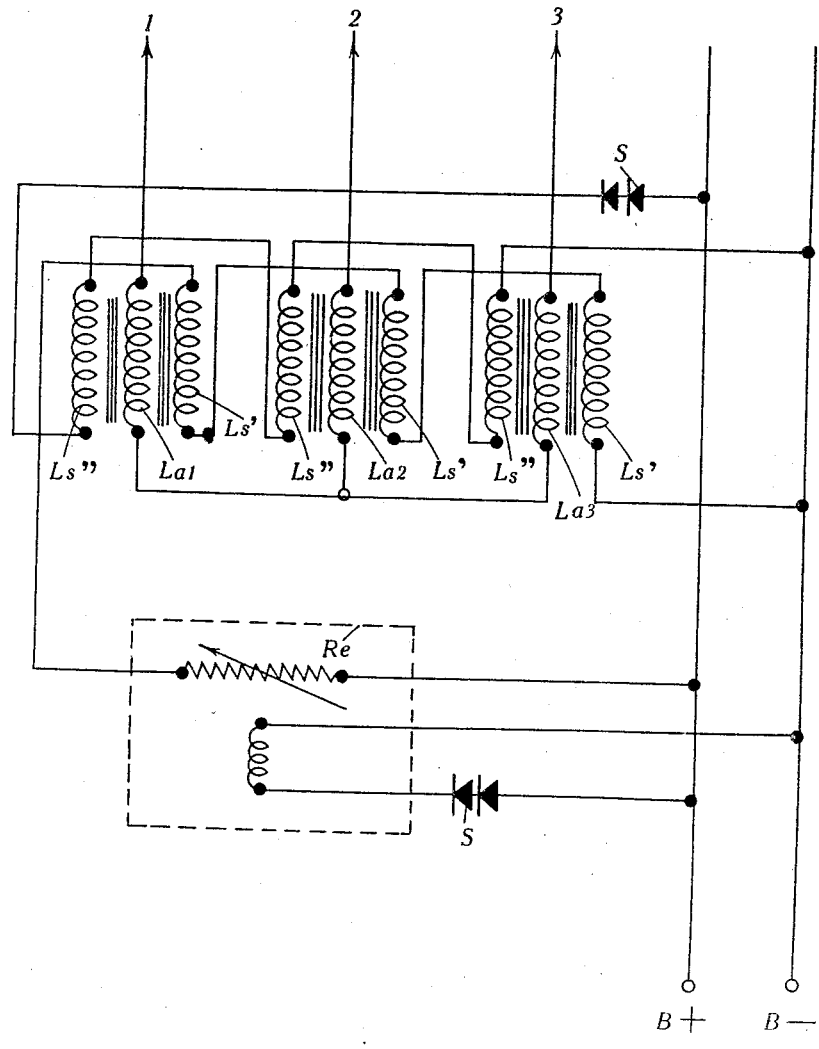
Fig. 3 shows another modification of a portion of the regulator circuit of Fig. 1.

When a quick acting regulator is employed in which the variations of the variable resistance and those of the voltage to be regulated are effected in the same direction arrangements such as those of Figs. 2 and 3 may be used.

Fig. 2 shows schematically a modified portion of the circuit of Fig. 1. In order to simplify the drawing only the output connections of the arrangement of Fig. 1 and the self-inductances $L_{a1}$, $L_{a2}$ and $L_{a3}$ have been shown. The quick acting regulating device is connected in shunt on the output connections, but its variable resistance is connected in shunt to the terminals of the saturation winding $L_{s'}$. The whole of the variable resistance of the regulator $R_e$ and of the saturation winding $L_{s'}$ is fed by an auxiliary rectifier arrangement $R_a$ with a considerable drop of tension directly fed by the alternating current supply line. In this way when the voltage of the network increases, the variable resistance of the rapid regulator increases and the voltage on the terminals of the resistance increasing, the current in the saturation winding $L_{s'}$ also increases which produces a corresponding increase of the current and thus of the drop of potential $E_s$ in the compounding self-inductances, which drop compensates the increase of tension of the network, and conversely.

Fig. 3 represents another means of compensating variations of voltage of the alternating current supply line at the primary of the transformer T when the variable resistance of the regulator and the tension to be regulated vary in the same direction. In this figure, in which only the interesting portion of the circuit has been shown, the quick acting regulator is shown connected as in the case of Fig. 1. However, a third winding $L_{s''}$ is attached to the self-inductances $L_{a1}$, $L_{a2}$, and $L_{a3}$, and to the saturation winding $L_{s'}$. This winding $L_{s''}$ is mounted differentially with respect to the saturation winding $L_{s'}$ and its substantially constant ampere turns are opposed to those of said winding controlled by the quick-acting regulator.

In this Fig. 3, elements S, such as dry contact rectifier elements, for example, are shown inserted in the connections of the quick-acting regulator $R_{e'}$ and of the tertiary windings $L_{s''}$. These elements have the property of offering a resistance decreasing with the current which passes through them in the direct direction, and this increases the sensitivity of the control device described. It is clear, however, that if elements of this nature have been shown by way of example in the case of Fig. 3, similar elements can also be suitably arranged in the control devices in the preceding figures with a view to increasing the sensitivity if desired.

What is claimed is:

1. A power supply arrangement for converting alternating current derived from a supply source of varying voltage into unidirectional current delivered to a load while maintaining the voltage across said load substantially constant in spite of variations of voltage of said supply source and variations in current drawn by said load, comprising a rectifier, connections for feeding said rectifier from said supply source, a first inductance having a variably saturable core connected to impede the supply of current from said source to said rectifier, a circuit including said load and said rectifier for supplying rectified current to said load, a first control winding disposed on said core to control the saturation thereof and connected in said output circuit so as to be traversed by a variable current dependent upon the current through said load, a second inductance having a variably saturable core connected to by-pass part of the current flowing through said first inductance, a second control winding disposed on the core of said second inductance to control the saturation thereof, a regulating device comprising a resistance variable in response to variations in the voltage in said output circuit, and means for supplying a unidirectional current to said second control winding under control of said resistance.

2. An arrangement according to claim 1, wherein said resistance is connected in series with said second control winding and wherein said means for supplying current to said second control winding comprises connections between said second control winding, said resistance and said output circuit.

3. An arrangement according to claim 1, wherein said resistance is connected in shunt with said second control winding.

4. An arrangement according to claim 1, wherein said means for supplying current to said second control winding comprises further rectifier means for deriving unidirectional current from said supply source.

5. An arrangement according to claim 1, further comprising a third control winding disposed on the core of said second inductance, and means for supplying current to said third winding in such sense that its magnetic influence is opposed to that of said second control winding.

HENRI EDMOND GIROZ.